United States Patent
Wakabayashi et al.

[11] Patent Number: 5,915,762
[45] Date of Patent: Jun. 29, 1999

[54] METHOD OF PRODUCING A CONNECTING ROD

[75] Inventors: Shinya Wakabayashi; Naoto Hara, both of Saitama, Japan

[73] Assignee: Honda Giken Kogyo Kabushiki Kaisha, Tokyo, Japan

[21] Appl. No.: 08/995,147

[22] Filed: Dec. 19, 1997

[30] Foreign Application Priority Data

Dec. 20, 1996 [JP] Japan ..................................... 8-341857

[51] Int. Cl.⁶ ................................................ B23P 15/00
[52] U.S. Cl. ........................................... 29/888.09; 29/888
[58] Field of Search ................................ 29/888.09, 888; 74/569

[56] References Cited

U.S. PATENT DOCUMENTS

| | | | |
|---|---|---|---|
| 4,747,286 | 5/1988 | Berstein et al. | ........................... 72/110 |
| 4,860,419 | 8/1989 | Hekman | ............................... 29/888.09 |
| 4,886,023 | 12/1989 | Werner et al. | .................... 123/197 AC |
| 5,203,228 | 4/1993 | Miyawaki et al. | ..................... 74/579 R |
| 5,524,507 | 6/1996 | Olmr et al. | ........................... 29/888.09 |
| 5,660,086 | 8/1997 | Carey | ................................... 29/888.09 |

FOREIGN PATENT DOCUMENTS

| | | |
|---|---|---|
| 583936 | 10/1958 | Italy . |
| A-60-012718 | 1/1985 | Japan . |
| 405231418 | 9/1993 | Japan . |
| 405272526 | 10/1993 | Japan . |

Primary Examiner—I. Cuda
Attorney, Agent, or Firm—Birch, Stewart, Kolasch & Birch, LLP

[57] ABSTRACT

A nutless type connecting rod of high mass production efficiency is provided. A large end section of a connecting rod is divided into a body side and a cap section, which are subjected to surface hardening treatment. Then the surface-hardened layer formed on a division face of the body side is removed. Thereafter, a female threaded hole is formed through the division face into the thickness of the body.

10 Claims, 6 Drawing Sheets

METHOD OF PRODUCING A CONNECTING ROD

BACKGROUND OF THE INVENTION

1. Field of the Invention

The present invention relates to a connecting rod for an internal combustion engine, and further, to methods for producing the connecting rod.

2. Description of the Background Art

Connecting rods are used for connecting the pistons of an engine to the crankshaft. Connecting rods are provided with a small end section and a large end section formed in a continuous monoblock at the two ends of the rod section. The large end section is divided into a body side and a cap part, and is then subjected to a surface hardening treatment process. Thereafter, the body side and the cap part are assembled together.

This assembling step is accomplished either by joining the cap part to the body side with bolts and nuts (hereinafter called the bolt-nut joining type; see Utility Model Laid-Open No. Sho 60-12718 for example) or by providing female threaded holes in the body side and joining the cap part to the body side with threaded bolts (hereinafter called the nutless type).

FIG. 6 is a diagram showing a partial sectional view of the large end section of a conventionally adopted bolt-nut joining type. As shown in FIG. 6, after the large end section is divided into a body side 1 and a cap part 2, throughholes 5 and 6 are bored respectively in seat sections 3 and 4. Then, the divided parts are subjected to a surface hardening treatment process, and then the cap part 2 is joined or assembled with the body side 1 with bolts 7 and nuts 8.

FIG. 7 is a diagram showing a partial sectional view of the large end section of a nutless type, also conventionally adopted, wherein joining is accomplished only with bolts 7 by providing female threaded holes 9 in the body side 1.

In FIG. 6, the seat section 3 on the body side 1 constitutes a shoulder part protruding sideways in the bolt-nut jointing type. However, no such seat section is formed on the body side 1 in the nutless type of FIG. 7, and therefore, the overall shape substantially forms a sloped shoulder.

In the bolt-nut joining type shown in FIG. 6, a considerable thickness portion A is provided near the seat section 3 so that this area does not become the weakest part in strength. For this reason, the thickness A near the seat section 3 is increased, causing the area of the seat section 3 constituting a shoulder to protrud sideways. This increase makes it difficult to achieve weight reduction of the whole connecting rod.

On the other hand, in the nutless type shown in FIG. 7, it is necessary either to form the female threaded holes 9 before the surface hardening treatment process, and then subject them to the surface hardening treatment process after an anti-carbon treatment process, or to form the female threaded holes 9 after subjecting them to the surface hardening treatment process. However, in the former case, the man-hours required for the anti-carbon treatment process increases and moreover, secure anti-carbon treatment is difficult. In the latter case, since the threads are machined into the surface hardening-treated layer, such machining becomes extremely difficult due to the high strength of the surface hardening-treated layer.

For these reasons, in both cases, the man-hours required to form the connecting rod increases. Moreover, difficult machining is inevitable. Therefore, a nutless type connecting rod which realizes weight reduction and which permits female threaded holes to be easily formed is desired. Further, a production method for producing such a connecting rod is desired.

SUMMARY OF THE INVENTION

Accordingly, it is an object of the present invention to provide a connecting rod having a large end section divided into a body side and a cap part, each subjected to surface hardening treatment, the cap part being joined to the body side by fastening bolts inserted into throughholes provided in the cap part and into female threaded holes provided in the body side, wherein division faces of the body side are non-hardened parts which have not been subjected to the surface hardening treatment.

In this case, the female threaded holes may penetrate into the division face of the body side without penetrating completely through the other side of the body side, thus forming a bottomed hole and not a throughhole. Alternatively, a throughole may be formed, although a throughhole would have to penetrate through the hardened layer on the other side of the body side.

A first method for producing this connecting rod is to remove the surface hardening-treated layers of the division faces after the body side is subjected to surface hardening treatment, and to form the female threaded holes into these division faces and into the thickness of the body side. Alternatively, a second method for producing this connecting rod is to subject the division faces on the body side to an anti-carbon treatment before the surface hardening treatment and allow the division faces on the body side after the surface hardening treatment to remain as hardened parts, and thereafter form the female threaded holes into these division faces and into the thickness of the body side. In either of the aforementioned production methods, said female threaded holes may be formed as a bottomed hole.

A connecting rod produced according to the present invention has unhardened division faces, which allows female threaded holes to be readily machined therein even if the body side of the large end section is subjected to surface hardening treatment. Accordingly, a nutless type connecting rod excelling in manufacturing efficiency can be produced.

Also, by forming the female threaded holes as bottomed holes, they can be formed at any desired depth within the thickness of body side until the depth reaches the surface hardening-treated layer on the other side of the body side. Thus, easier formation of the female threaded holes is facilitated. Moreover, since the thickness of the body side near the bottomed end of the female threaded holes need not be made larger than necessary, the overall weight of the connecting rod can be reduced.

The first recited connecting rod production method enables the division faces of the unhardened parts to be readily formed by first subjecting the body side, after being separated from the end part, to a surface hardening treatment and later removing the surface hardening-treated layers of the division faces.

In the second recited connecting rod production method, unlike the first method, the division faces are subjected to an anti-carbon treatment prior to surface hardening treatment. Thus, the division faces can be similarly formed as unhardened parts. Because such an anti-carbon treatment can be accomplished with relative ease, the production of the division faces as unhardened parts is made easier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
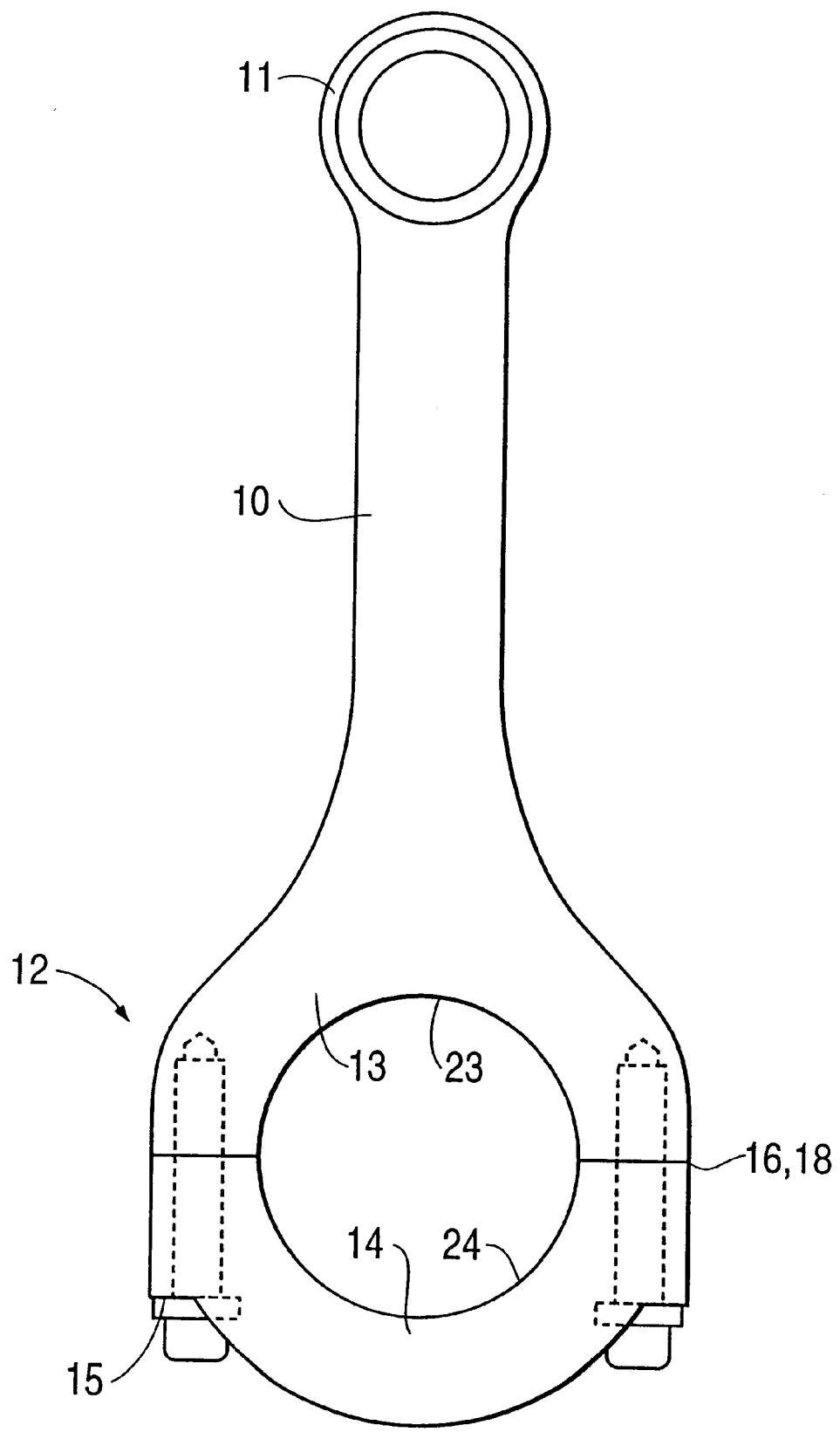
FIG. 2 is a view illustrating the whole connecting rod of the present invention.

An embodiment of the invention is described with reference to the drawings. As shown in FIG. 2, a connecting rod according to this embodiment is provided at one end of a rod section 10 with a small end section 11 to be connected to the piston (not shown) and at the other end with a large end section 12 to be connected to the crankshaft (not shown). The connecting rod is formed in a continuous monoblock.

This connecting rod is formed of an iron-based or some other metallic material in a monoblock by either casting or forging. Afterwards, the large end section 12 is divided into a body side 13 and a cap section 14.

Figure 1:
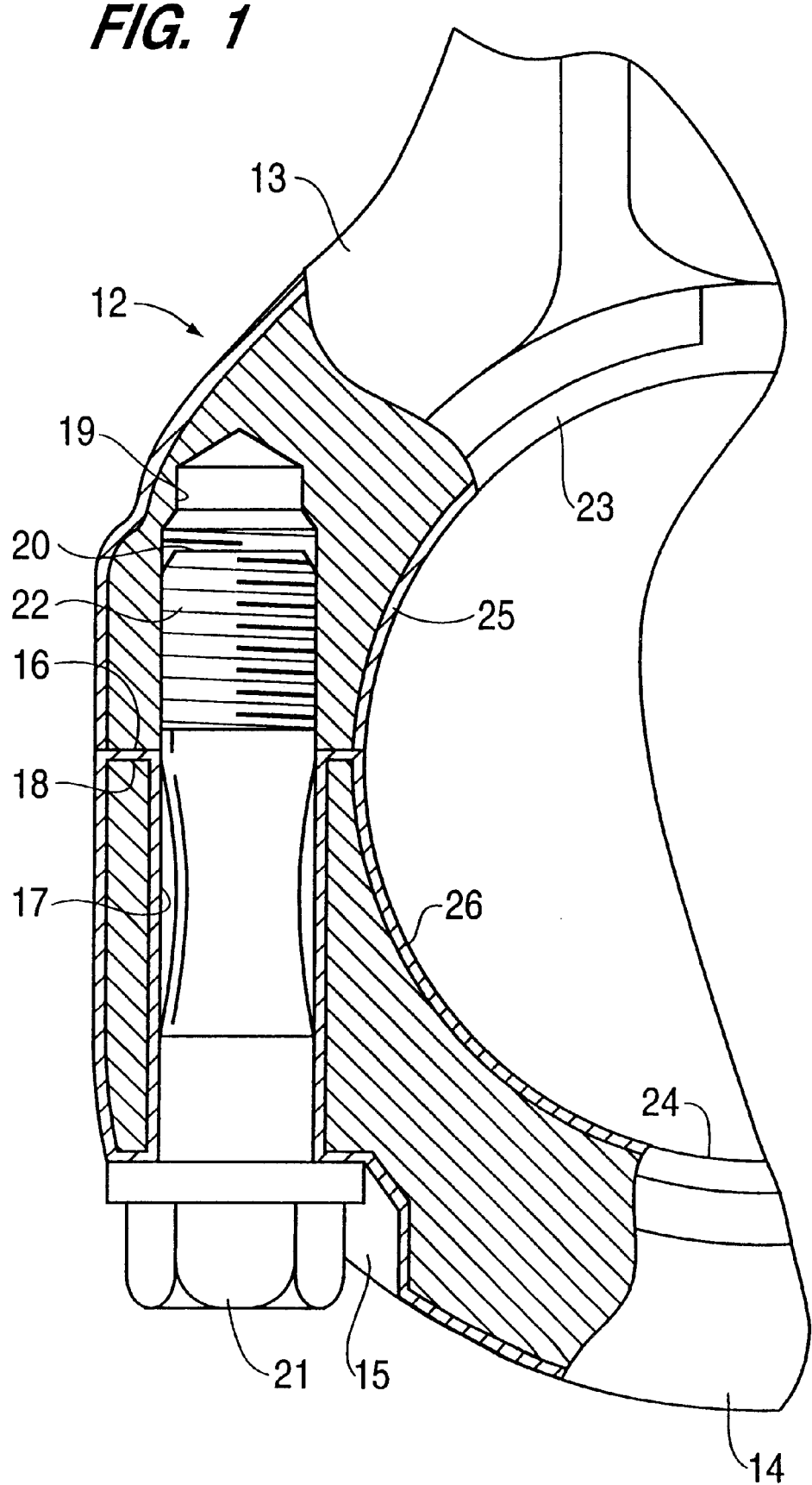
FIG. 1 is a partial sectional view illustrating a portion of the large end section of a connecting rod produced according to the present invention.

As is evident from FIG. 1, throughholes 17 are formed in the cap section 14 from a seat section 15 toward a division face 16. On the body side 13 opposite to the cap section 14, underholes 19 are formed from a division face 18 in the lengthwise direction of rod section 10, with female threaded holes 20 being formed therein.

The body side 13 and the cap section 14 are joined by fastening male threaded parts 22 of bolts 21 inserted into the throughholes 17 from the cap section 14 side into the female threaded holes 20 to constitute a nutless type connecting rod.

Reference numerals 23 and 24 in FIG. 1 refer to the inner circumference of the hole section for connection to the crankshaft, and reference numerals 25 and 26 refer to surface hardening-treated layers.

Next, a production method for this connecting rod is described with reference to FIG. 3 through FIG. 5.

Figure 3:
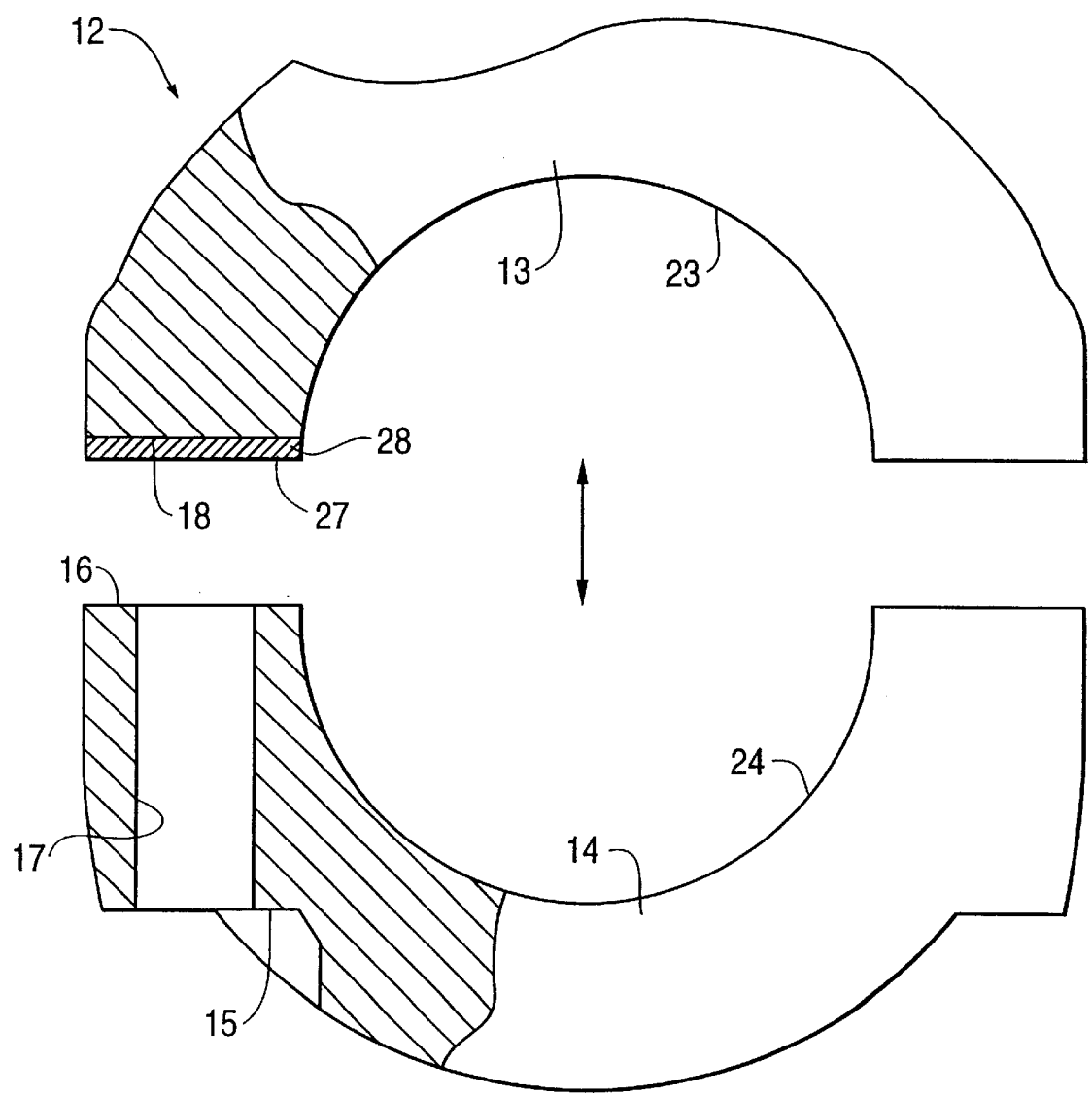
FIG. 3 is a partial sectional view illustrating a portion of the large end section in the dividing process.

First, in the division process of FIG. 3, the large end section 12 is divided into the body side 13 and the cap section 14. At this time, a division face 27 is formed immediately after the division of the body side 13 which extends from the final division face 18 in the direction toward the cap section 14 by a thickness equivalent to a dummy section 28.

The dummy section 28 is a thickness part equivalent to the portion that is removed after the surface hardening treatment. The dummy section 28 is provided in the continuous monoblock to the body side 13.

Figure 4:
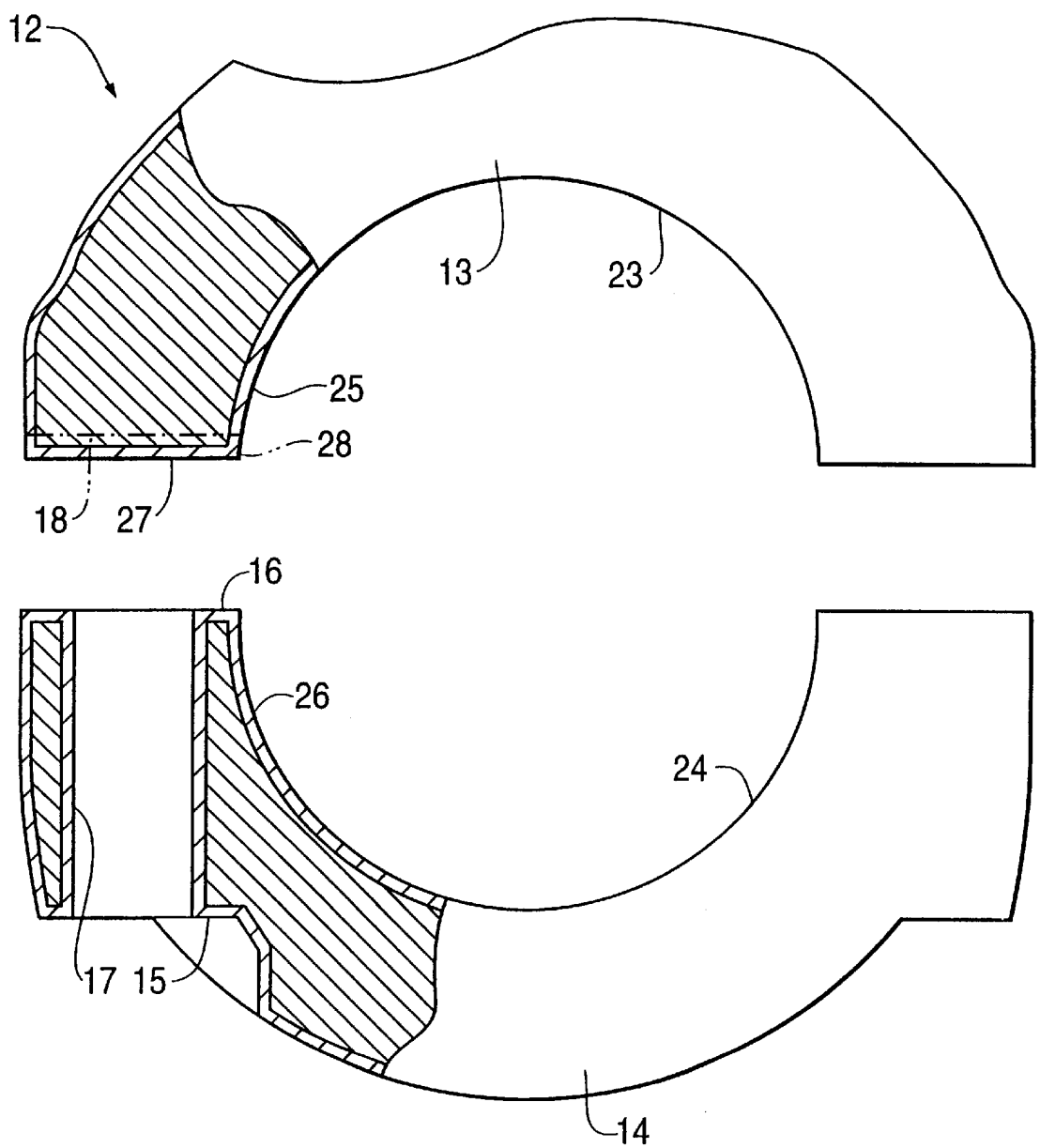
FIG. 4 is a partial sectional view illustrating a portion of the large end section in the surface hardening treatment process.

In the surface hardening treatment process of FIG. 4, the body side 13 and the cap section 14 are subjected to cementation quenching treatment, and the surface hardening-treated layers 25 and 26 are formed on the surface. In this case, obviously the surface hardening-treated layers 25 and 26 are also formed on each of the division faces 16 and 27 and in the throughholes 17.

Figure 5:
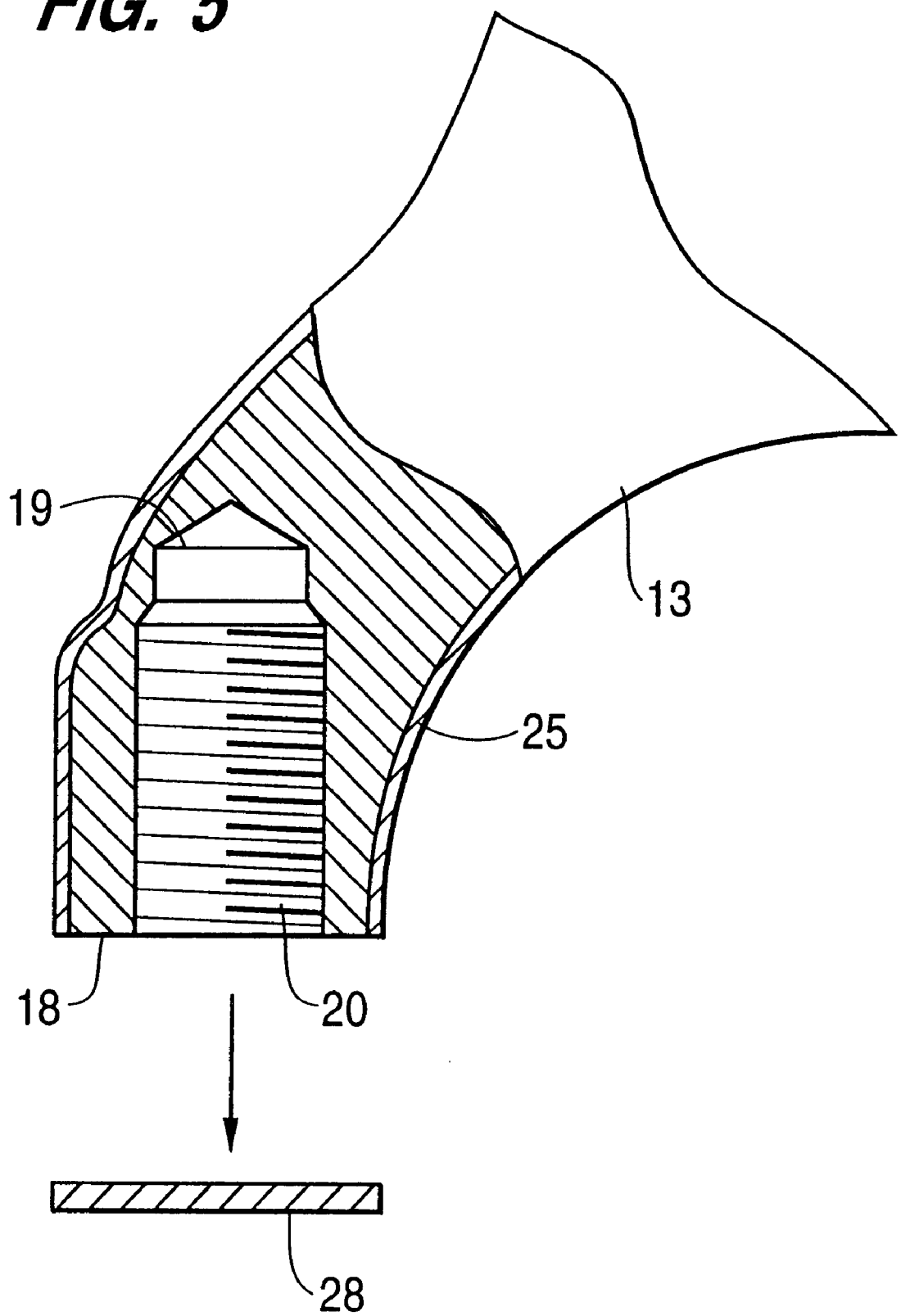
FIG. 5 is a partial sectional view illustrating a portion of the large end section in the female threaded hole machining process.
Figure 6:
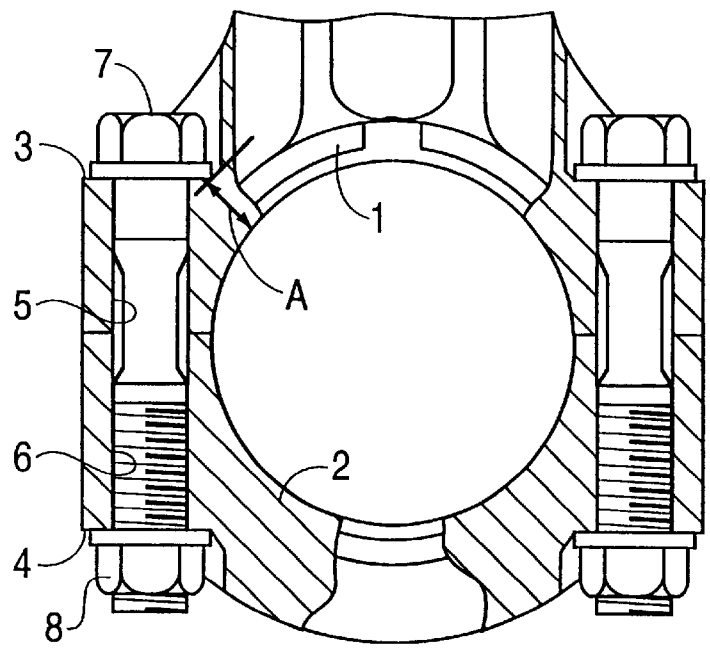
FIG. 6 is a partial sectional view of a prior art connecting rod illustrating a portion of the large end section having a bolt and nut connection.
Figure 7:
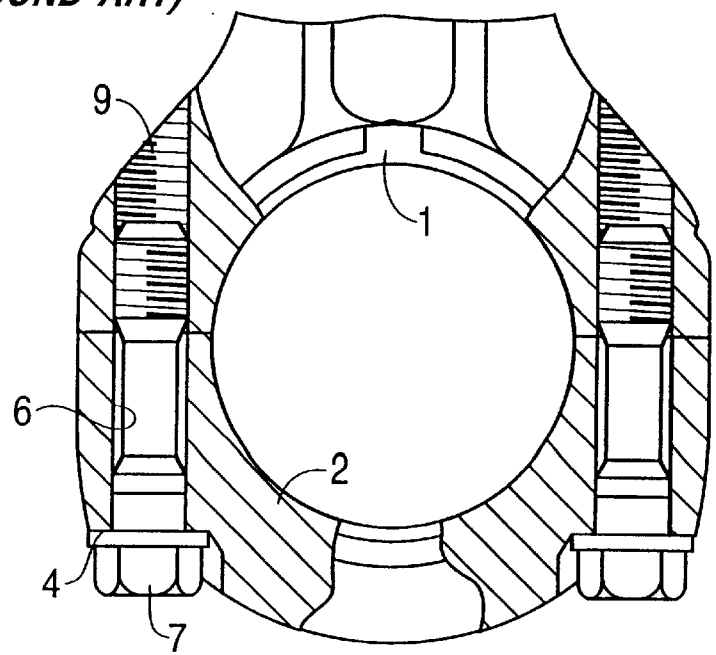
FIG. 7 is a partial sectional view of a second prior art connecting rod illustrating a portion of the large end section having threaded throughholes.

In the female threaded hole machining process of FIG. 5, first the dummy section 28 is removed from the body side 13 after the body side 13 has been subjected to surface hardening treatment. The division face 18 is thereby formed as an unhardened part of an uncemented layer.

Then, the underhole 19 is machined into the thickness of the body from this division face 18 along the lengthwise direction of the rod section 10, and the female threaded hole 20 is formed, thereby producing a body side 13 suitable for use as part of a nutless connecting rod.

The machining depth of the underhole 19 and the female threaded hole 20 can be controlled as desired within a range in which the underhole 19 does not penetrate to a surface hardening-treated layer 25. Thus, the underhole 19 is formed as a bottomed hole which does not penetrate through the other exterior side of the body side 13.

Because the connecting rod of the present invention is provided without a surface hardening-treated layer 25 on the division face 18 of the body side, but instead has an unhardened part, the female threaded hole 20 can be readily formed in this part. Thus, a body side 13 suitable for a nutless connecting rod can be realized with high mass production efficiency.

Further, by making the female threaded hole 20 bottomed, its depth can be freely controlled within a range in which it does not reach the surface hardening treated layer 25. Moreover, the thickness near the inner circumference face 23 of the body side 13 need not be made thicker than necessary, thereby making it possible to reduce the weight of the whole connecting rod.

Furthermore, in the above-described connecting rod production method, since the dummy part 28 is removed after the surface hardening treatment, any special anti-carbon treatment is unnecessary. Accordingly, the number of man-hours which would be needed for that purpose can be saved. Thus, the production method is superior in mass production efficiency.

An alternative method may be utilized instead of the above-described method of removing the dummy part 28 after the surface hardening treatment. In the alternative method, the surface hardening treatment is performed after the division face 18 is subjected to an anti-carbon treatment. In this alternative method, the removal of the dummy part which would otherwise be subsequently needed can be dispensed with. Moreover, since this anti-carbon treatment covers the whole division face 18, and since it is far easier to perform than the conventional treatment applied to the inside of the female threaded hole, this method also serves to improve mass production efficiency.

In this connecting rod and its production method, the female threaded hole 20 may alternatively be formed to penetrate the other side of the body side 13 instead of being bottomed. Even in this way, the portion of the surface hardened layer 25 that has to be machined to produce the female threaded hole is only the portion at the tip of the female threaded hole. Since no surface-hardened layer is formed on the division face 18, mass production efficiency is still tremendously improved over the conventional case.

Also, the large end section may either be a product of division after the body side and the cap section are formed in a monoblock as described above, or one of subsequent integration by fastening together the separetly formes cast or forged sections. In the latter case, the meeting faces of the body side and the cap section constitute division faces under the invention of the present application.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A method for producing a connecting rod comprising the steps of:

providing a connecting rod member having a large end section;

dividing the large end section into a body member and a cap member, said body member and said cap member having respective mating division faces;

subjecting the body member and the cap member to a surface hardening treatment process;

removing a surface hardening-treated layer from at least one of the division faces of the body member after the body member has been subjected to the surface hardening treatment process; and boring a hole into said at least one division face of the body member.

2. The connecting rod production method as set forth in claim 1, wherein said hole is a bottomed hole which terminates in said body member.

3. The connecting rod production method as set forth in claim 2, wherein said bottomed hole is female threaded.

4. The connecting rod production method as set forth in claim 1, wherein said hole is a throughhole which extends completely through said body member.

5. The connecting rod production method as set forth in claim 1, wherein a hole is bored into each of the division faces of the body member.

6. A method for producing a connecting rod comprising the steps of:

providing a connecting rod member having a large end section;

dividing the large end section into a body member and a cap member, said body member and said cap member having respective mating division faces;

subjecting the division faces to an anti-carbon treatment;

subjecting the body member and the cap member to a surface hardening treatment process; and boring a hole into said at least one division face of the body member, wherein the division faces on the body member after the surface hardening treatment remain unhardened due to the anti-carbon treatment.

7. The connecting rod production method as set forth in claim 6, wherein said hole is a bottomed hole which terminates in said body member.

8. The connecting rod production method as set forth in claim 7, wherein said bottomed hole is female threaded.

9. The connecting rod production method as set forth in claim 6, wherein said hole is a throughhole which extends completely through said body member.

10. The connecting rod production method as set forth in claim 6, wherein a hole is bored into each of the division faces of the body member.

\* \* \* \* \*